Feb. 1, 1927.                                                         1,616,063
                       E. E. NOVOTNY ET AL
      ADJUSTABLE CYLINDRICAL TUBING AND METHOD OF MAKING THE SAME
                       Filed Aug. 6, 1924        3 Sheets-Sheet 1

INVENTOR.
Emil E. Novotny and
Frank W. Cary
BY Cavanagh & James
ATTORNEYS

Feb. 1, 1927.

E. E. NOVOTNY ET AL 1,616,063

ADJUSTABLE CYLINDRICAL TUBING AND METHOD OF MAKING THE SAME

Filed Aug. 6, 1924   3 Sheets-Sheet 2

INVENTORS
Emil E. Novotny and
Frank W. Cary
BY
Cavanagh & James
ATTORNEYS

Feb. 1, 1927.
E. E. NOVOTNY ET AL
1,616,063
ADJUSTABLE CYLINDRICAL TUBING AND METHOD OF MAKING THE SAME
Filed Aug. 6, 1924  3 Sheets-Sheet 3
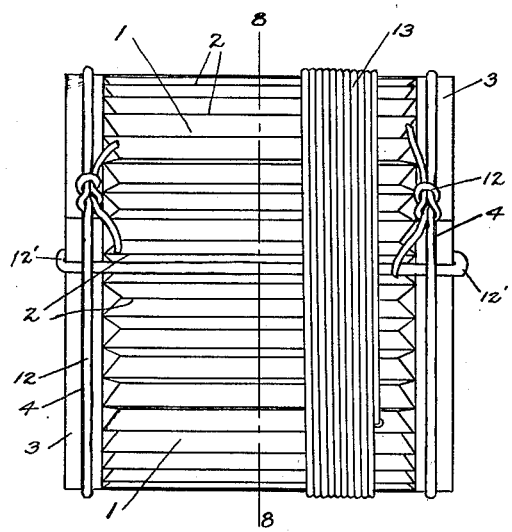
Fig. 7
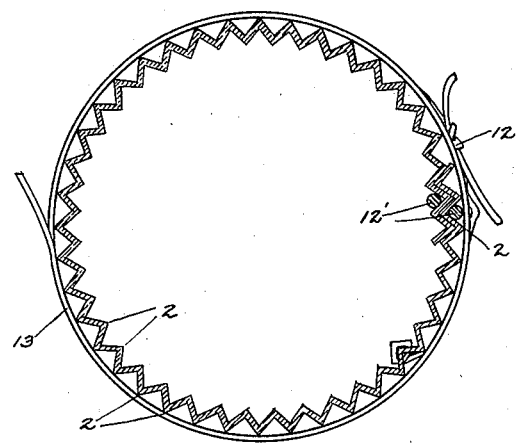
Fig. 8
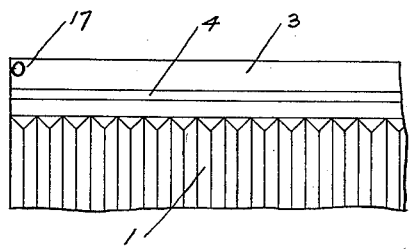
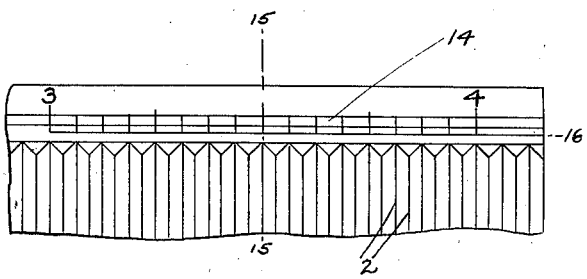
Fig. 9
Fig. 10
INVENTORS
Emil E. Novotny
Frank W. Cary
BY
Cavanagh James
ATTORNEYS Patented Feb. 1, 1927.

1,616,063

UNITED STATES PATENT OFFICE.

EMIL E. NOVOTNY, OF PHILADELPHIA, AND FRANK W. CARY, OF DRESHER, PENNSYLVANIA, ASSIGNORS TO JOHN STOGDELL STOKES, OF SPRING VALLEY FARMS, HUNTINGDON VALLEY POST OFFICE, PENNSYLVANIA.

ADJUSTABLE CYLINDRICAL TUBING AND METHOD OF MAKING THE SAME.

Application filed August 6, 1924. Serial No. 730,536.

This invention relates to adjustable cylindrical tubing and method of making the same, being particularly adapted for the manufacture of radio instruments and inductances and for other electrical purposes where dielectric tubing is required.

It is well known in the art that dielectric losses or absorption occur in inductances and that this may be avoided by either minimizing the amount of dielectric material present in such support or else supporting the wiring at a distance from the mass of such dielectric material. Likewise, tubing of different sizes is required in order to make inductances of various values in order to conveniently assemble such units after being made, and it has, therefore, been the practice of carrying in stock various diameters of tubing such as that made of hard rubber or phenol resins, which, from the standpoint of the jobber, retail dealer and user, has been an annoyance on account of the multiplicity of sizes necessarily carried.

In the making of completely cylindrical tubes as at present used, when made from phenol resins the practice has been to impregnate a quantity of paper sheets with a phenol resin varnish, evaporate the solvent, and subsequently roll the sheets on a suitable mandrel, and then forming these sheets while supported on said mandrel in a suitable two-part mold. Another method has been the elimination of the step of pressing in the mold by the placing of such tubes into an oven heated at a temperature which will cause the reaction of the phenol resin to its infusible form. Both of these methods do not produce dielectric materials of the highest order, inasmuch as uniform pressure cannot be applied through either of these methods. Furthermore, it is essential that the tube walls be relatively thick, inasmuch as the tubing necessarily shrinks on to the mandrel due to the shortening of the material because of reaction shrinkage which sets in. This has, therefore, made it impossible to produce tubing having thin walls.

Our method comprises the making of a product whereby the tube making material is produced in the flat, permitting of uniform pressure being applied at all points and at the same time a ready means of forming such flat tubing into cylindrical form, and a means provided whereby the formed tube may be conveniently held in such cylindrical shape.

A means is likewise provided whereby the wire wound on the tube is supported from the major portion of the body of dielectric material composing said tube, thereby producing a convenient form of dielectric cylinder having low absorption losses and yet having a rigid and firm structure.

The accompanying drawings show in detail one preferred form of our invention.

In the drawing—

Figure 7 is a side view of the completed and assembled tube in the process of winding.

Figure 8 is a cross section of Figure 7 on the line 8—8.

Figure 9 is a fragmentary plan view of the scale marking on the finished flat strip.

Figure 10 is a side view of the scale marking after the flat piece has been curved into cylindrical form.

Referring in detail to the drawing—

Figure 1:
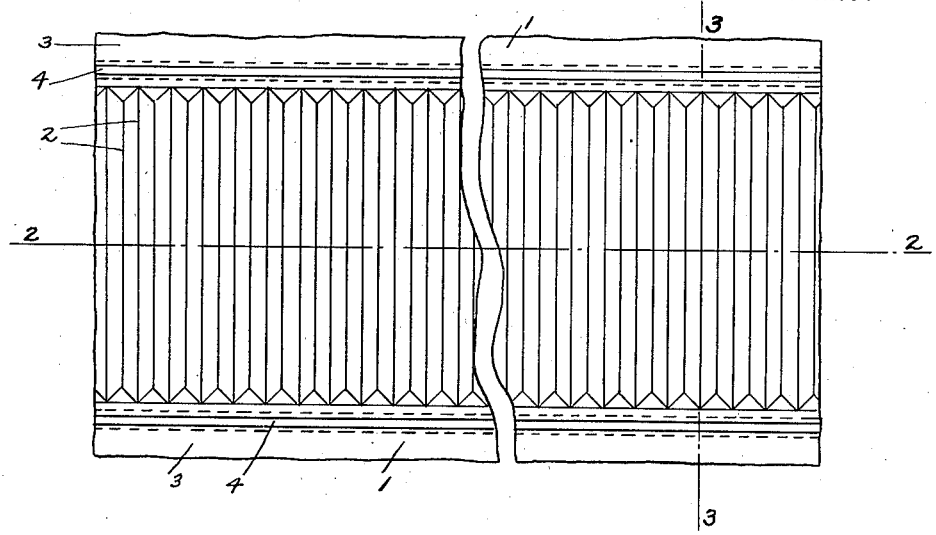
Figure 1 is a fragmentary plan view of a preformed raw material which is to be finally molded into the thin, flexible, curvable body.
Figure 4:
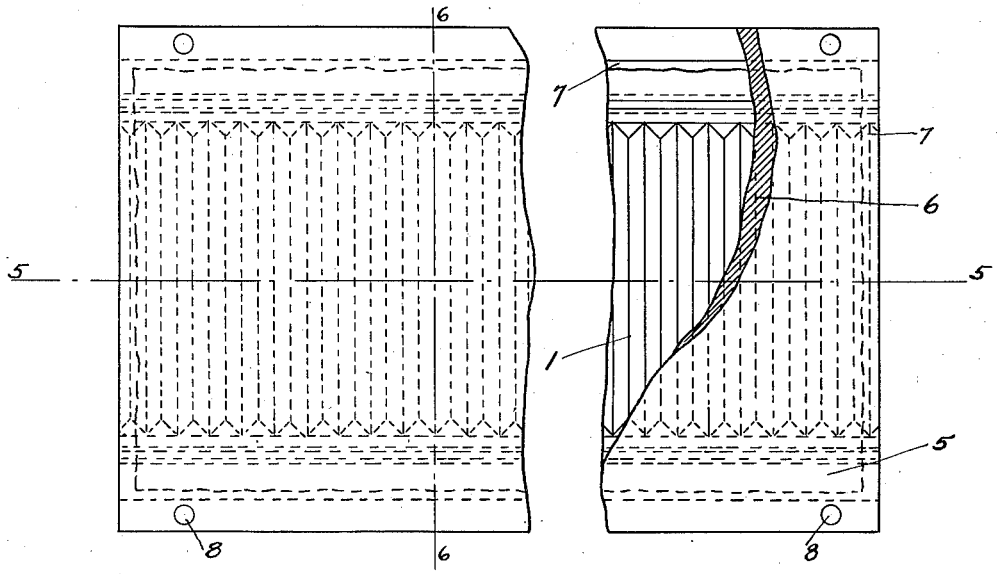
Figure 4 is a fragmentary plan view of the mold and the finished tube material being formed therein.
Figure 5:
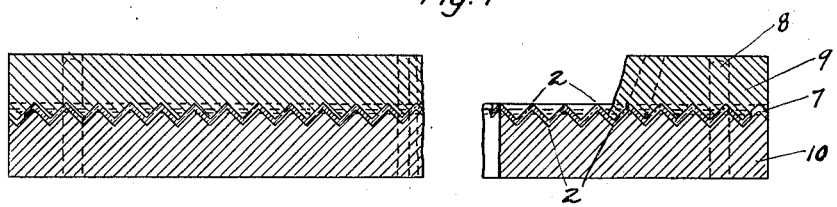
Figure 5 is a fragmentary cross section of Figure 4 along line 5—5.
Figure 6:
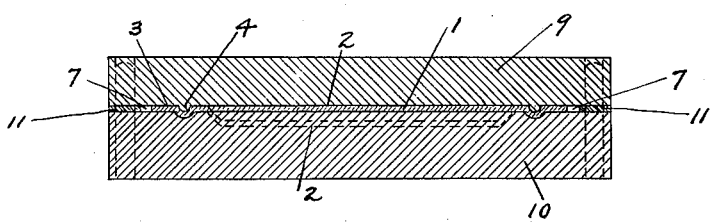
Figure 6 is a cross section of Figure 4 along line 6—6.

Figure 1 indicates the raw material at 1, which is roughly preformed and considerably thicker than the final dimensions intended for the finished part. This raw material may be preformed in several ways, but our preferred method is to roll sheets of suitable plastic material such as sheets of paper impregnated with a phenol resin, from which solvents have been removed and which is rolled through suitable forming rollers in order that the material is stretched preferably a tooth at a time, thus preventing tearing and objectionable distortion. After the sheet is preformed, it will readily accommodate itself to the shape of the die which is illustrated in Figures 4, 5 and 6. Should this preforming not be done, the stretch would be too excessive where a material of relatively thin cross section is to be made, and the resulting product would be cut through or broken. So that Figure 1 may be better understood, the toothed elevations appear at 2, while at 3 we show a binding strip which is provided with a suitable depression indicated at 4.

Figure 2:
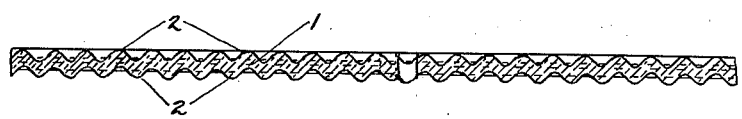
Figure 2 is a cross section of Figure 1 along line 2—2.

Figure 2 indicates the preformed material as an entirety by the numeral 1, and the roughly formed toothed elevations at 2.

Figure 3:
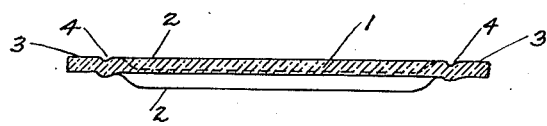
Figure 3 is also a cross section of Figure 1 along line 3—3.

Figure 3 merely shows another view of this structure, which is self explanatory.

Figure 4 shows the die 5 as an entirety, the top half of which is cut away at 6 to show the raw material 1. This die is preferably, but not necessarily, of the flash type, the flash or overflow taking place at the points indicated at 7. Proper aligning pins are indicated at 8.

In Figure 5 the fragmentary cross section along line 5—5 better illustrate the formation of the toothed members, again shown at 2. It should be noted that these finally formed toothed members are of almost razorlike sharpness, in order that as little contact with the insulating material is made when the tube is in use as a support for a coil of wire for an inductance. The upper half of die indicated at 9 is substantially of the same shape as the lower half indicated at 10, so that when the tube is rolled in cylindrical form the overlapping portions will seat properly.

Figure 6 shows the tube material as an entirety at 1, the toothed elevations at 2, the binding strip at 3, and the depression for conveniently binding the tube material into cylindrical form at 4. This illustration brings out clearly the relative position of the plain tube body or binding strip 3 to the toothed elevations 2 and to the depressed portion 4. At 11 are shown bearer strips which maintain the proper distance between the upper half 9 and lower half 10 of the mold 5.

Figure 7 is a side view of a preferred form of such tube assembled for winding. At 1 is indicated the raw material portion of the cylindrical tube as an entirety, the toothed elevations at 2, the binding strip at 3 the depression at 4, the cylinder form being maintained by suitable fastening means such as cord or wire 12 preferably wound in the depression 4 and by likewise winding a cord or wire 12' which is located between toothed elevations 2 at points where they overlap. A few turns of wire 13 are shown wound around the tube in order to indicate the relative position of the elevations 2 on tube 1 to said wire 13.

Figure 8 is a cross sectional view of Figure 7 along the line 8—8. This figure is self explanatory. It is, however, shown inasmuch as the relation of the wire 13 to the elevations 2 is more clearly indicated. It will be noted that practically a line contact is made at only certain elevated predetermined points.

Figure 9 indicates a modified form of this tube wherein a scale 14 is molded or stamped on the binding strip 3 having the relation of diameter times 3.1416, thus conveniently enabling the user to select any particular grooves in order to form a cylinder of suitable diameter. As an actual example where a tube of 3½" in diameter is required, the user would cut the tube material on the scale 14 at the indication 3.5" which is indicated at line 15—15. This cut line would end at line 16, and a right angle cut along line 16 would be made, allowing a few toothed elevations 2 to remain for the purpose of overlapping.

Figure 10 is a fragmentary side view of the scale marking 14, indicating the manner of butting the joint at line 15—15. Stated otherwise, the dimensional point 3.5" is now in butt contact with the other end of tube 1, which is indicated by the zero scale dimension 17.

If it is desired to still further increase the air insulation area, the tube, when rolled on a suitable mandrel, may have notches cut helically in the elevations in order that these notches space the turns of wire, thus eliminating the use of insulation on the conductor material. This further reduces absorption losses. Furthermore, where these tubes are to be used in large quantities of certain predetermined diameters, they may be molded in the flat with the wire spacing notches in the toothed elevations, thus eliminating the extra lathe operation.

Wherein we have described the use of a paper product impregnated with a phenol resin, it is to be understood that we do not necessarily limit ourselves to this form of insulation inasmuch as any insulating material which is sufficiently plastic to be readily formed into the shape illustrated under the action of heat and pressure will do as a suitable equivalent.

What we claim is—

1. A tube making material comprising a sheet of flexible dielectric composition having tooth-like members formed on both sides thereof and means for fastening the sheet into a cylindrical form.

2. A tube making material comprising a sheet of dielectric composition and having on its edges a scale indicating the overlapping points in order to produce a tube of certain preferred diameter.

3. An insulating tube composed of a flexible sheet of insulating material rolled into cylindrical form with the meeting edges of the sheet overlapping in adjustable relation, said tube having tooth-like ribs extending longitudinally over the outer faces thereof.

4. An adjustable insulating tube composed of a flexible fibre sheet impregnated with a phenolic resin and having longitudinally extending ribs formed on both walls thereof, the meeting edges of the sheet forming the tube overlapping in adjustable relation.

5. The herein described method of making a sheet of flexible tube making material which consists in previously forming a sheet of plastic dielectric material to the rough dimensions of the finished product, placing said material in a suitable mold and then compressing and forming said material into a flexible water-proof tube making blank having longitudinally extending ribs formed on both sides thereof.

In testimony whereof, EMIL E. NOVOTNY and FRANK W. CARY have signed their names to this specification this 4th day of August, 1924.

EMIL E. NOVOTNY.
FRANK W. CARY.